United States Patent
Miura et al.

(10) Patent No.: US 8,186,487 B2
(45) Date of Patent: May 29, 2012

(54) VEHICLE DISC BRAKE DEVICE

(75) Inventors: Yasutaka Miura, Ueda (JP); Yoichi Sato, Ueda (JP); Masayuki Sugita, Wako (JP); Yoshinori Yamanoi, Wako (JP); Hitoshi Ohi, Wako (JP); Atsushi Takano, Wako (JP); Nobuteru Fujii, Wako (JP)

(73) Assignee: Nissin Kogyo Co., Ltd., Ueda-shi (JP)

( * ) Notice: Subject to any disclaimer, the term of this patent is extended or adjusted under 35 U.S.C. 154(b) by 263 days.

(21) Appl. No.: 12/699,352

(22) Filed: Feb. 3, 2010

(65) Prior Publication Data

US 2010/0193301 A1 Aug. 5, 2010

(30) Foreign Application Priority Data

Feb. 3, 2009 (JP) .................. 2009-022949

(51) Int. Cl.
*F16D 65/14* (2006.01)
(52) U.S. Cl. ................... 188/73.41; 188/72.9
(58) Field of Classification Search ............... 188/73.41, 188/72.9
See application file for complete search history.

(56) References Cited

U.S. PATENT DOCUMENTS

| | | | | |
|---|---|---|---|---|
| 2,873,005 A * | 2/1959 | Butler | ......... | 188/73.41 |
| 3,186,517 A * | 6/1965 | Harrison | .......... | 188/73.41 |
| 3,273,675 A * | 9/1966 | Brown | .......... | 188/73.41 |
| 3,927,736 A * | 12/1975 | Bergles | .......... | 188/26 |
| 4,030,774 A * | 6/1977 | Foster | .......... | 280/261 |
| 4,102,440 A * | 7/1978 | Wood | .......... | 188/72.7 |
| 4,592,451 A * | 6/1986 | Persson | .......... | 188/71.9 |
| 7,635,050 B2 * | 12/2009 | Yamamoto | .......... | 188/73.1 |

FOREIGN PATENT DOCUMENTS

| | | |
|---|---|---|
| JP | 01-261523 | 10/1989 |
| JP | 03-38431 | 4/1991 |
| JP | H06-28376 | 4/1994 |
| JP | 2003-294068 | 10/2003 |

* cited by examiner

*Primary Examiner* — Robert A Siconolfi
*Assistant Examiner* — James Hsiao
(74) *Attorney, Agent, or Firm* — Rankin, Hill & Clark LLP

(57) ABSTRACT

A vehicle disc brake device for preventing snow, ice, and mud from adhering to a caliper includes a body-anchoring part provided in a cylinder of a caliper, the body-anchoring part for securing a wire guide used to support a brake wire. The body-anchoring part has a first surface oriented along the longitudinal direction of the brake wire, and a second surface located on the side opposite the first surface. A wire-guide-anchoring part is secured to the second surface. The first surface is a flat, inclined surface.

4 Claims, 5 Drawing Sheets

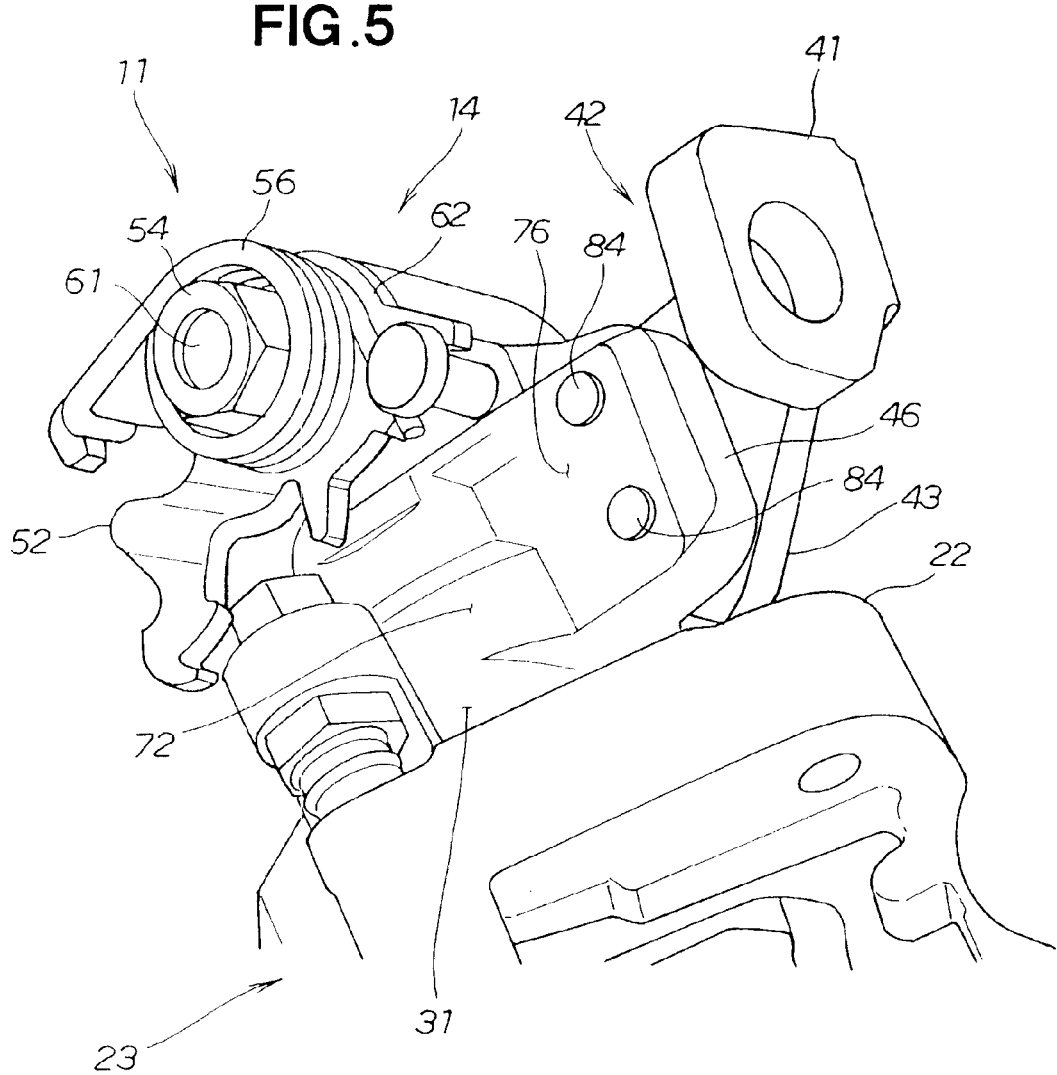

VEHICLE DISC BRAKE DEVICE

FIELD OF THE INVENTION

The present invention relates to a vehicle disc brake device having a brake wire for a parking brake.

BACKGROUND OF THE INVENTION

Disc brake devices apply hydraulic pressure to clamp a disc rotor that rotates with the wheels, and thereby applies a braking action on the wheels. Disc brake devices used on rear wheels are generally provided with a parking brake device, and a wire guide of the parking brake device is bolted securely in place (e.g., Japanese Utility Model Application Laid-Open Publication No. H06-28376).

There are known in the art parking brake devices such as the device disclosed in Japanese Patent Application Laid-Open No. 2003-294068, in which a wire guide for supporting a brake wire of the device is integrally formed with a caliper body.

However, a drawback with the prior art is that in cold weather conditions, snow and ice tend to adhere to the wire guide after having been kicked up from the road surface. Once a large enough amount thereof has accumulated, the snow and ice may then start to adhere to the wire, making the parking brake harder to operate.

In particular, snow, ice and mud may adhere to the bolt head and the outer surface of the caliper near the bolt in the disc brake device disclosed in the H06-28376 publication, increasing the likelihood that it will then adhere to the wire guide and impair the function of the brake wire.

SUMMARY OF THE INVENTION

It is therefore an object of the present invention to provide a vehicle disc brake device that can prevent snow, ice, and mud from adhering to the surface of the caliper facing the brake wire.

According to the present invention, there is provided a vehicle disc brake device which comprises: a pivoting lever secured to a rotary shaft for operating a mechanical brake mechanism to restrict rotation of a wheel of a vehicle, the rotary shaft being supported in a caliper having a cylinder; a brake wire attached to the pivoting lever; a body-anchoring part protruding, upon attachment of the disc brake device to the vehicle, from a side of a downwardly-directed bottom of the caliper cylinder outwardly in a radial direction of the cylinder; and a wire guide secured to the body-anchoring part, for supporting the brake wire, wherein the wire guide has a wire-guide-anchoring part secured to the body-anchoring part and a wire-supporting part connected to the wire-guide-anchoring part, for supporting the brake wire, the body-anchoring part has a first surface positioned to face a length of the brake wire and a second surface positioned on a reverse side of the first surface, at least the first surface comprises a flat surface and is inclined toward the second surface relative a line passing over a radial center of the cylinder and a center of a proximal end of the body-anchoring part, and the wire-guide-anchoring part is secured to the second surface.

With this arrangement, the region between the outer surface of the caliper and the protruding body-anchoring part can be made substantially flat, and devoid of any narrow-angled regions. Moreover, since the outer surface of the caliper facing the direction of the brake wire will not have a step provided for the wire guide, the substantially flat shape will not be compromised. As a result, snow, ice, and mud can be prevented from adhering to the caliper surface facing the brake wire.

Preferably, the wire-guide-anchoring part and the body-anchoring part are secured together via a bolt that is threadedly engaged therewith while the bolt has a distal end facing a same direction as the first surface. Therefore, the head part of the bolt is not disposed facing the brake wire; no large step is formed on the first surface by the protruding head part of the bolt; and snow, ice, and mud kicked up by the wheels can be reliably prevented from adhering to the first surface.

Desirably, the bolt has a length selected such that the distal end protrudes from the flat surface of the first surface of the body-anchoring part. Thus, even when snow, ice, or mud passes over the first surface, it will move to the distal end of the bolt from the flat first surface and readily fall off. As a result, any snow, ice, or mud adhering to the flat surface can be readily removed.

In a preferred form, a length of protrusion of the distal end of the bolt is set to be smaller than a length of protrusion of a head part of the bolt.

A wide angle is preferably formed by the first surface of the body-anchoring part and a substantially horizontal outer peripheral surface of the cylinder bottom. Consequently, the area between the outer peripheral surface of the cylinder bottom and the first surface is not recessed but substantially flat, and snow, ice or mud will not readily accumulate in that area.

BRIEF DESCRIPTION OF THE DRAWINGS

A preferred embodiment of the present invention will be described in detail below, by way of example only, with reference to the accompanying drawings, in which:

FIG. 5 is a perspective view showing a vicinity of a body-anchoring part of the disc brake device of FIG. 3.

DETAILED DESCRIPTION OF THE PREFERRED EMBODIMENT

Figure 1:
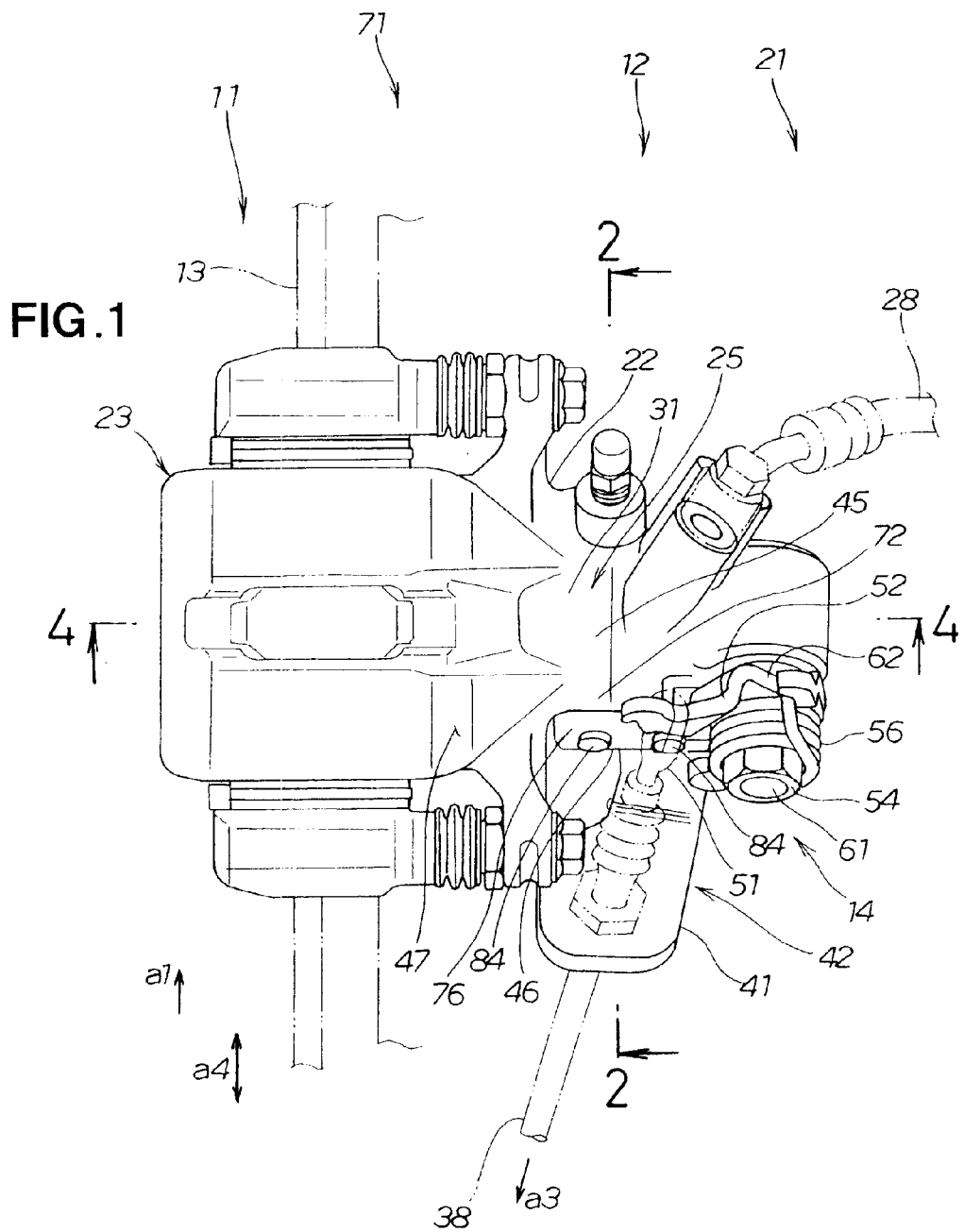
FIG. 1 is a rear view showing a vehicle disc brake device according to an embodiment of the present invention.
Figure 2:
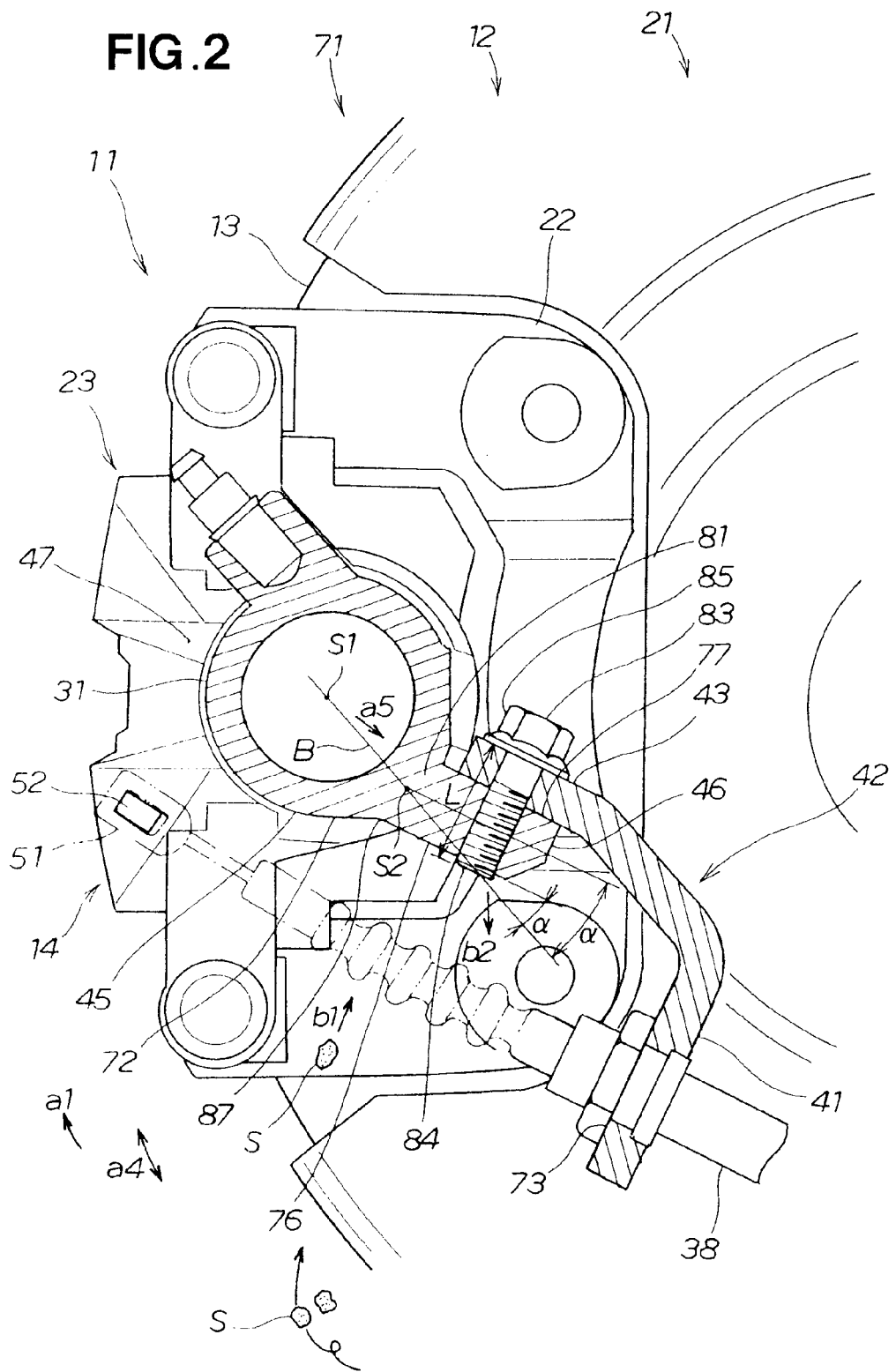
FIG. 2 is a sectional view taken along line 2-2 of FIG. 1.

As shown in FIGS. 1 and 2, the vehicle disc brake device 11 is used on a rear wheel 12 of a vehicle, and presses both surfaces of a disc rotor 13 that rotates with the rear wheel 12, whereby a braking action is applied to the rear wheel 12. The disc brake device 11 has a parking brake device 14, which is a mechanical brake mechanism. When the vehicle is moving forward, the disc rotor 13 will rotate in the direction shown by arrow a1.

Figure 3:
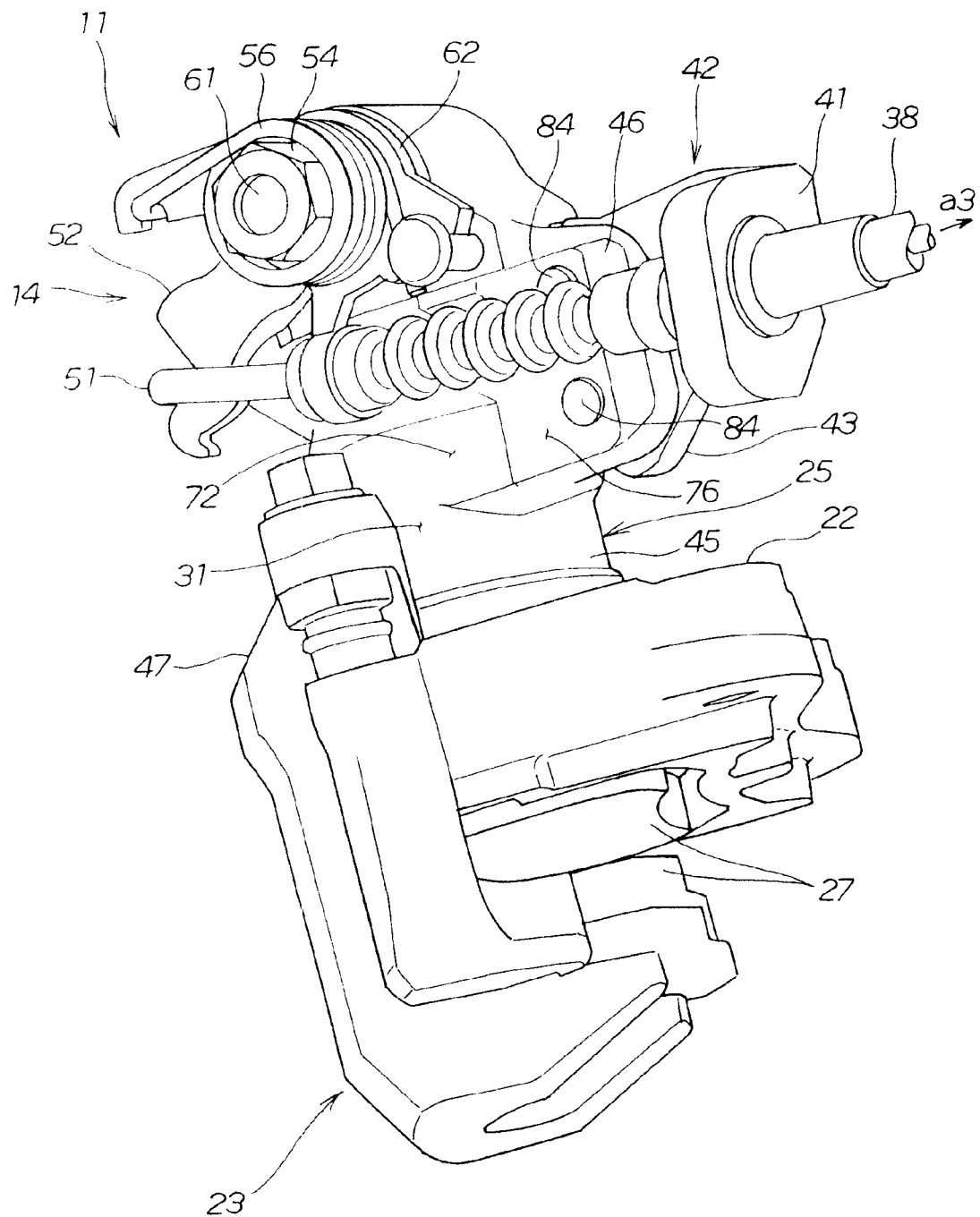
FIG. 3 is a perspective view showing the disc-brake device of FIG. 1.

As shown in FIGS. 1 through 3, the disc brake device 11 has a connecting member 22 that is connected to a rear suspension device 21; a caliper 23 that is attached to the connecting member 22; a hydraulic brake mechanism 25 that is provided to the caliper 23; and pads 27 for applying pressure to both surfaces of the disc rotor 13 An operating fluid is supplied to the hydraulic brake mechanism 25 by a hydraulic hose 28.

The hydraulic brake mechanism 25 and the parking brake device 14 shown in FIGS. 1 through 5 will now be described.

Figure 4:
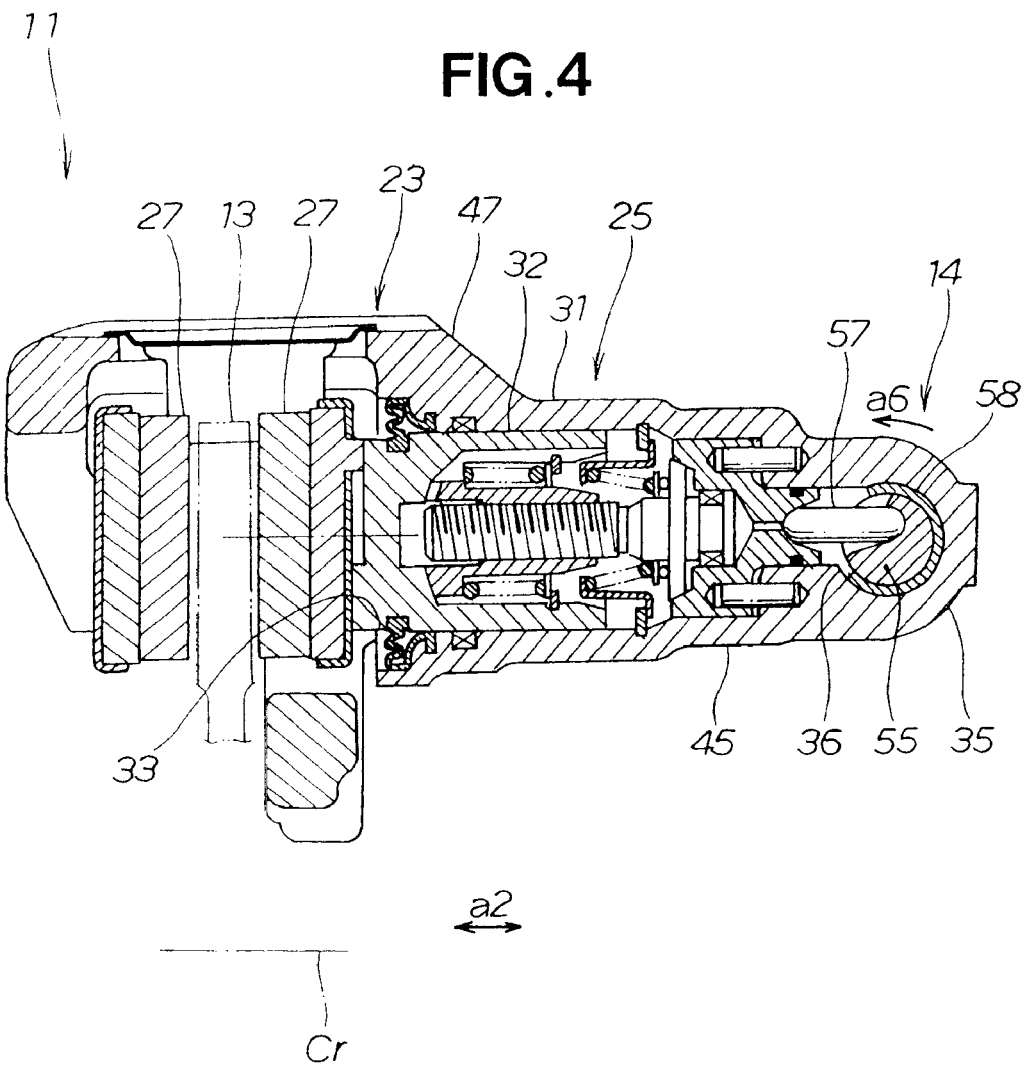
FIG. 4 is a cross-sectional view taken along line 4-4 of FIG. 1.

The hydraulic brake mechanism 25 has a cylinder 31 associated with the caliper 23, and a piston 32 slidably fitted within the cylinder 31, as shown in FIGS. 3 and 4.

The cylinder 31 opens toward the disc rotor 13 (opening 33), and has its length extending in the direction of the axial line Cr of the disc rotor 13 (the direction indicated by arrow a2). A shaft-insertion hole 36 is formed in a rear end part 35 facing the opening 33. A pad 27 is disposed on the piston 32.

The parking brake device 14 is provided with a parking brake cable 38 that is connected to a parking brake lever (not shown) disposed inside a vehicle compartment (not shown); a wire guide 42 for supporting the parking brake cable 38 at a distal end (first end) 41 thereof; and a body-anchoring part 46 formed on an outer peripheral surface 45 of the cylinder 31, there being a anchoring part (second end) 43 of the wire guide 42 fastened to the body-anchoring part 46. In a broad sense, the outer peripheral surface 45 of the cylinder 31 is part of the outer surface 47 of the caliper 23.

As shown in FIG. 3, the parking brake device 14 is provided with a pivoting lever 52 to which a connecting end 51 of the parking brake cable 38 is hooked; a rotating cam shaft 55 (FIG. 4) integrally fitted to the pivoting lever 52 and secured in place by a nut 54; a return spring 56 fitted on the outer surface of the nut 54; and a push-rod mechanism 57 (FIG. 4) that is in contact with the cam shaft 55. The piston 32 is connected to the push-rod mechanism 57.

As shown in FIG. 4, the cam shaft 55 is attached, via a bearing 58, in the shaft-insertion hole 36 formed in the cylinder 31. When the cam shaft 55 is made to rotate by the pulling force of the parking brake cable 38 shown in FIG. 3 (in the direction indicated by arrow a3), the piston 32 advances toward the disc rotor 13 and presses the pad 27 against it.

A fulcrum end part 62 of the pivoting lever 52 is securely fitted onto an end part 61 (FIG. 3) of the cam shaft 55, the end part 61 protruding from the shaft-insertion hole 36 (by a length corresponding to the height of the nut 54).

As illustrated in FIGS. 1 through 5, the pivoting lever 52 is anchored to a rotary shaft (cam shaft 55) that operates a mechanical brake mechanism (parking brake device 14) for restricting the rotation of wheels 71 (in the direction of arrow a4). A brake wire (parking brake cable 38) is attached to the pivoting lever 52. The rotary shaft (cam shaft 55) is supported by the cylinder 31 of the caliper body (caliper 23). The body-anchoring part 46 protrudes outwardly in the radial direction of the cylinder 31 (in the direction of arrow a5 of FIG. 2) from a side of the cylinder bottom 72 that faces the underside of the cylinder 31. The brake wire (parking brake cable 38) is supported by the wire guide 42 that is secured to the body-anchoring part 46 and turns the pivoting lever 52 (in the direction of arrow a6 of FIG. 4).

As shown in FIG. 2, the wire guide 42 has a wire-guide-anchoring part 43 for securing the wire guide to the body-anchoring part 46, and a wire-supporting part 73 which is connected to the wire-guide-anchoring part 43 and faces the pivoting lever 52. The body-anchoring part 46 has a first surface (bottom surface) 76 that faces the parking brake cable 38, and a second surface (upper surface) 77 disposed on the other side of the first surface 76 and lying on of the wire-guide-anchoring part 43. At least the first surface 76 is a flat surface. The first surface 76 is inclined toward the second surface 77 side with respect to line B (at angle a). Line B connects the radial center S1 of the cylinder 31 as viewed in cross-section and the center S2 of a proximal end 81 of the body-anchoring part 46. The wire-supporting part 73 is part of the first end 41 of the wire guide 42.

A bolt 83 is used to screw the wire-guide-anchoring part 43 to the body-anchoring part 46, the distal end 84 of the bolt 83 being parallel to the first surface 76.

The length L (FIG. 2) of the bolt 83 is set so that the distal end 84 thereof protrudes from the flat surface of the first surface 76 of the body-anchoring part 46. The length to which the distal end 84 of the bolt 83 protrudes is set so as to be less than the length to which the head part 85 protrudes (height of the head).

Next, an operation the disc brake device 11 will be described.

As shown in FIG. 2, snow S lying on a road surface in cold weather conditions, is kicked up by the rotation of the wheels (in the direction of arrow a1) and by air currents formed underneath the vehicle as it moves. The snow S scatters onto the disc brake device 11 used for the rear wheels. Even if the snow S might adhere to the wire guide 42 and the body-anchoring part 46 as shown by arrow b1, it will readily fall off the flat surface of the first surface 76 of the body-anchoring part 46. As a result, snow, ice, and mud kicked up by the wheels can be prevented from adhering between the body-anchoring part 46 and the parking brake cable 38.

In the disc brake device 11 according to the present embodiment, the distal end 84 of the bolt 83 is parallel to the first surface 76 of the body-anchoring part 46. Therefore, a large step caused by the protruding head part 85 of the bolt 83 is not formed on the first surface 76; and snow, ice, and mud thrown up by the wheels can be more reliably prevented from adhering to the disc brake device.

Since the distal end 84 of the bolt 83 protrudes from the flat inclined surface of the first surface of the body-anchoring part 46, snow, ice, and mud will pass onto the distal end 84 of the bolt 83 from the flat part of the first surface 76 and readily fall in the direction indicated by arrow b2. Even if snow, ice, or mud does adhere to the flat surface, it can be readily removed. Furthermore, melted snow and ice will accumulate on the distal end 84 and fall off in drops without spreading over the flat surface of the first surface 76, whereby it can be removed.

As shown in FIG. 2, the body-anchoring part 46 is inclined toward the second surface 77 side (angle α) with respect to the line B connecting the radial center S1 of the cylinder 31 and the center S2 (relative to the thickness direction) of the proximal end 81 of the body-anchoring part 46. Accordingly, there is no narrow angle formed between the first surface 76 and the (substantially horizontal) outer peripheral surface 45 of the downward-facing cylinder bottom 72 of the cylinder 31 associated with the caliper 23. Specifically, a boundary region 87 formed between these two surfaces is substantially flat and devoid of any large recesses, which is beneficial in that and snow, ice, and mud will not readily accumulate in the region 87.

An example of the disc brake device of the present invention was given in an embodiment in which the device was used in a rear wheel, but the disc brake device can also be used in a front wheel.

The disc brake device of the present embodiment illustrated an example in which the disc brake device is provided with a hydraulic brake mechanism and a mechanical brake mechanism, but the device may be provided solely with a mechanical brake mechanism.

The disc brake device of the present embodiment is not limited to use in automobiles; it may also be applied to a variety of vehicles including, e.g., two-wheeled automotive vehicles and all-terrain vehicles (ATVs).

Obviously, various minor changes and modifications of the present invention are possible in light of the above teaching.

It is therefore to be understood that within the scope of the appended claims the invention may be practiced otherwise than as specifically described.

What is claimed is:

1. A vehicle disc brake device comprising:
   a pivoting lever secured to a rotary shaft for operating a mechanical brake mechanism to restrict rotation of a wheel of a vehicle, the rotary shaft being supported in a caliper having a cylinder;
   a brake wire attached to the pivoting lever;
   a body-anchoring part protruding, upon attachment of the disc brake device to the vehicle, from a side of a downwardly-directed bottom of the caliper cylinder outwardly in a radial direction of the cylinder; and
   a wire guide secured to the body-anchoring part, for supporting the brake wire,
   wherein the wire guide has a wire-guide-anchoring part secured to the body-anchoring part and a wire-supporting part connected to the wire-guide-anchoring part, for supporting the brake wire,
   the body-anchoring part has a first surface positioned to face a length of the brake wire and a second surface positioned on a reverse side of the first surface,
   at least the first surface comprises a flat surface and is inclined toward the second surface relative a line passing over a radial center of the cylinder and a center of a proximal end of the body-anchoring part, and
   the wire-guide-anchoring part is secured to the second surface;
   wherein a bolt threadingly extends through the wire-guide-anchoring part and the body-anchoring part and threadingly engages at least the body-anchoring part to secure the wire-guide-anchoring part to the body-anchoring part, and the bolt has a distal end issuing on the first surface and extending in a same direction as the first surface.

2. The disc brake device of claim 1, wherein a length of the bolt is selected such that the distal end protrudes from the flat surface of the first surface of the body-anchoring part.

3. The disc brake device of claim 2, wherein a length of protrusion of the distal end of the bolt is set to be smaller than a length of protrusion of a head part of the bolt.

4. The disc brake device of claim 1, wherein a wide angle is formed by the first surface of the body-anchoring part and a substantially horizontal outer peripheral surface of the cylinder bottom.

* * * * *